Feb. 10, 1970 T. W. LINTON 3,494,655
TRAILER CONSTRUCTION
Filed March 21, 1968 3 Sheets-Sheet 2
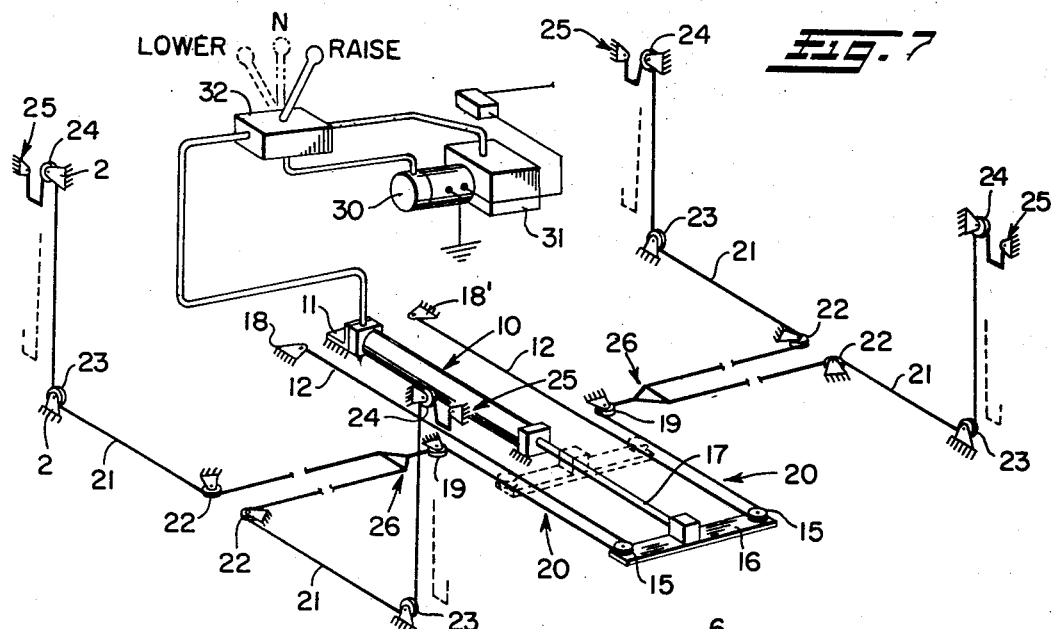
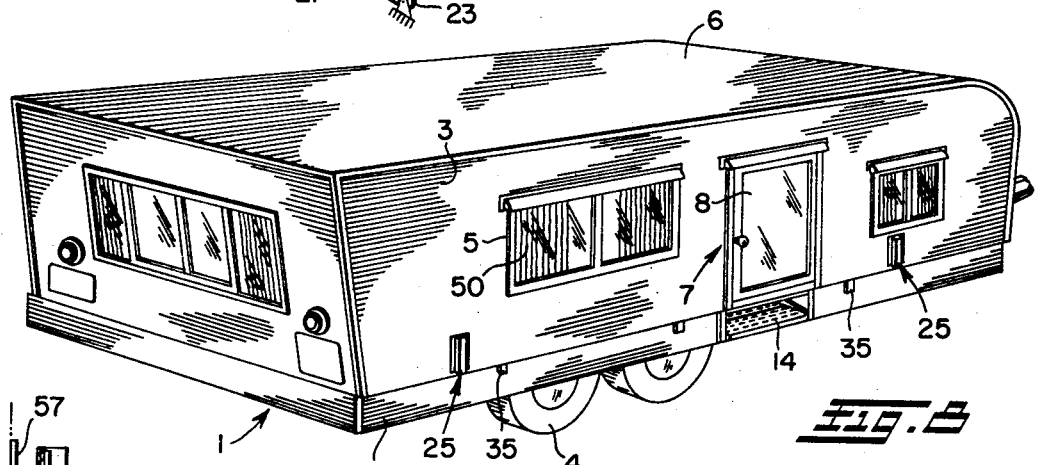
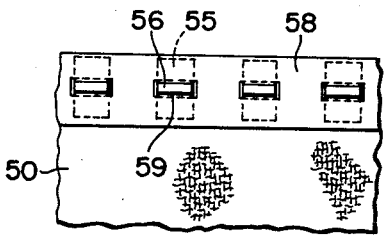
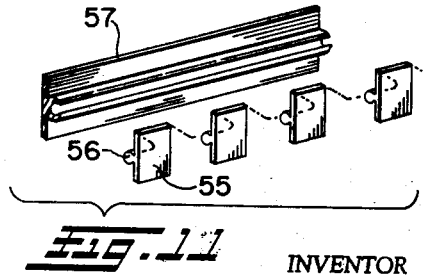
INVENTOR
THOMAS W. LINTON
BY
Oberlin, Maky, Donnelly & Renner
ATTORNEYS

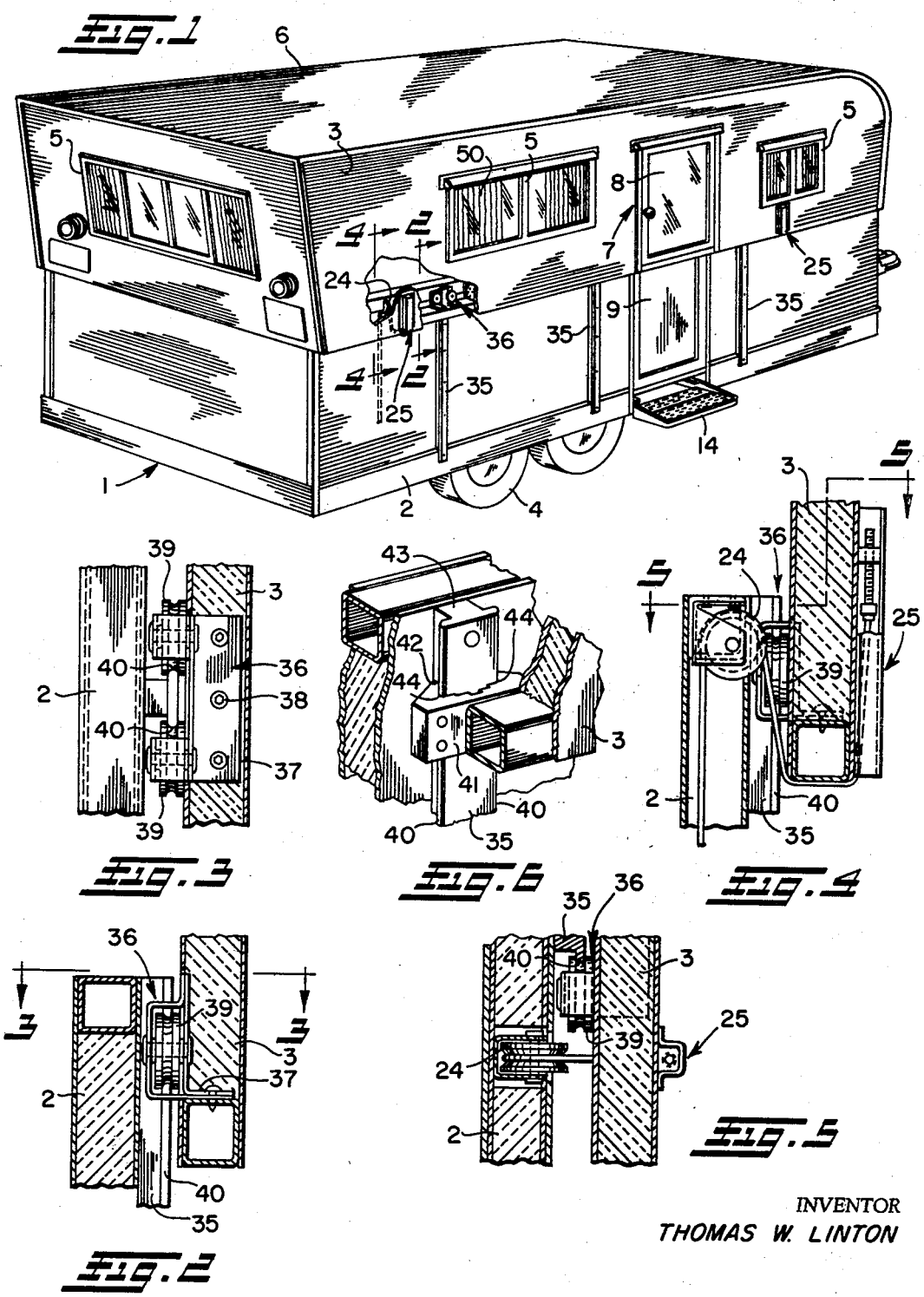

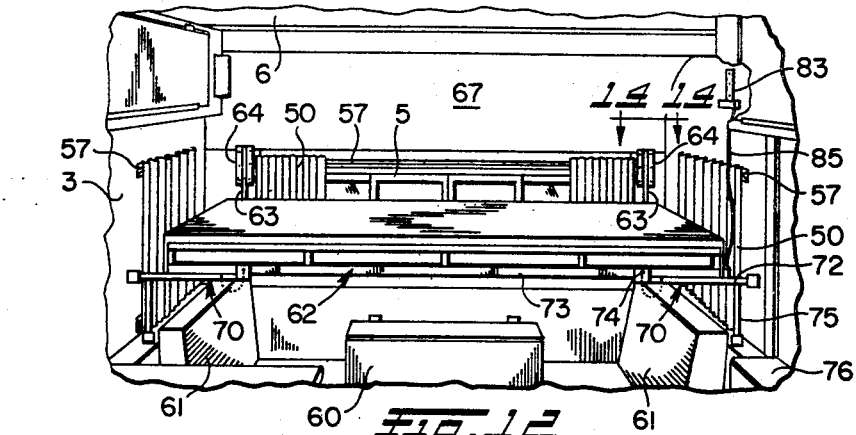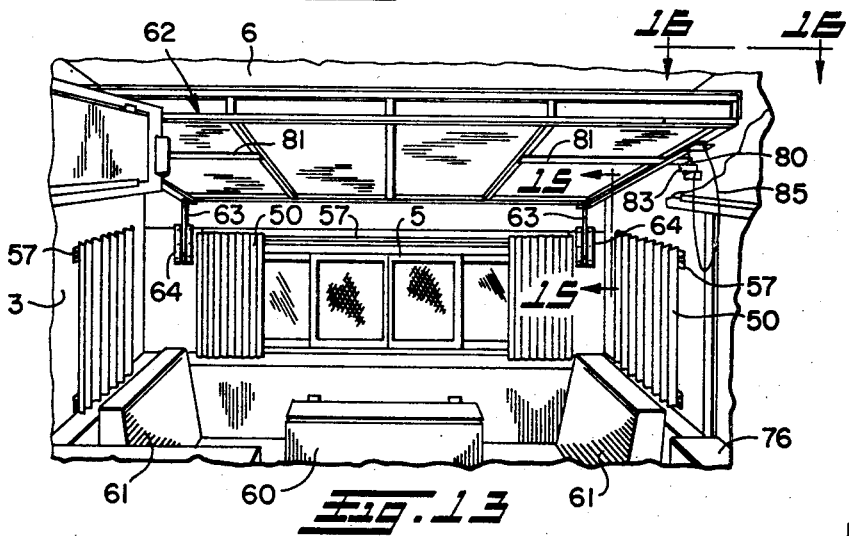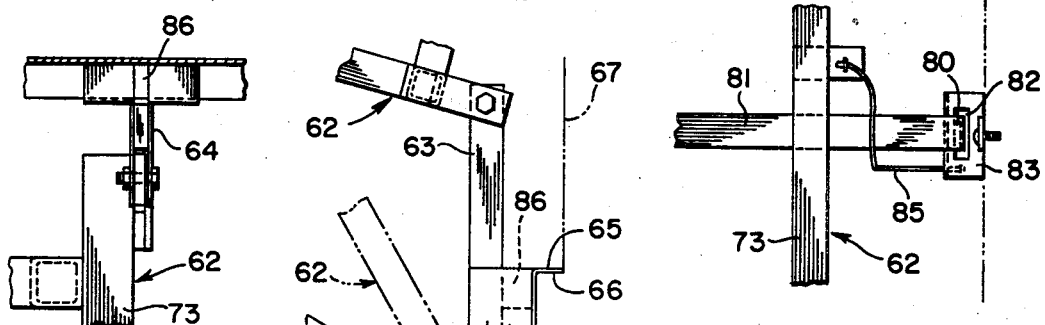

3,494,655
TRAILER CONSTRUCTION
Thomas W. Linton, Bellville, Ohio, assignor to The Snyder Trailer Company, Butler, Ohio, a corporation of Ohio
Filed Mar. 21, 1968, Ser. No. 714,892
Int. Cl. B60p *3/32*
U.S. Cl. 296—23          18 Claims

ABSTRACT OF THE DISCLOSURE

A telescoping trailer having an upper telescoping trailer section movable by means of a plurality of cables operatively connected to a single piston-cylinder assembly in such a manner that the upper trailer section moves twice as far for each increment of movement of the piston, and guides for maintaining proper alignment between the upper and lower trailer sections during such movement. Glides attached to the hems of the curtains snap into tracks on the inner wall surface above and below the windows to hold the curtains in place during such telescoping movement, and an upper bunk is pivotally mounted to the upper trailer section for ready swinging movement out of position where it will not interfere with lowering of the upper trailer section.

BACKGROUND OF THE INVENTION

This invention relates generally as indicated to an improved trailer construction and more particularly to certain improvements in telescoping trailers of the type having a wheel-mounted lower trailer section and a telescoping upper trailer section which may be raised or lowered as desired with respect to the lower trailer section.

Telescoping trailers are becoming increasingly popular because of their adaptability to be made low and compact for safe high speed travel and storage and opened up to provide full sized living quarters within a relatively short period of time. However, some difficulty has been encountered in designing a lift mechanism for the upper trailer section which is both economical and reliable. Multiple fluid cylinders have been successfully used to operate the upper trailer section, but even with suitable guides for maintaining proper alignment between the upper and lower trailer sections during relative movement, there is a tendency for the upper trailer section to hang up on the lower trailer section, especially when the fluid is not uniformly supplied to each of the actuating cylinders or the weight on the upper trailer section is not uniformly distributed. Moreover, the fluid cylinders are usually not very fast acting, since because of cost and other factors, the pump capacity is often quite limited.

Another factor which has greatly increased the time required to raise and lower the upper trailer section is the necessity of having to remove and replace the drapes around the windows to assure against them being damaged or torn during telescoping of the upper trailer section over the lower section. Similarly, if the trailer is equipped with an upper bunk bed, it must be dismantled before the upper trailer section can be lowered and subsequently set up again the next time it is to be used, which is no small task. All of these factors have at least to a certain extent offset the desirable aspects of the telescoping trailer.

SUMMARY OF THE INVENTION

With the foregoing in mind, it is a principal object of this invention to provide a telescoping trailer of the type generally described, but with an improved lift and guide mechanism for greatly increasing the rate at which the upper trailer section may be raised and lowered while completely eliminating any tendency of the upper trailer section to hang up on the lower trailer section during raising and lowering movements.

Another object is to provide such a trailer construction in which the upper and lower hems of the curtains are maintained closely adjacent the inner wall surface of the upper trailer section thus permitting the curtains to be left in place during lowering and raising of the upper trailer section without damage to the curtains.

Still another object is to provide a trailer construction with a unique upper bunk which may be readily swung out of the way without dismantling where it will not interfere with the lowering of the upper trailer section, and just as readily swung back into position as desired when the upper trailer section is in the raised position.

These and other objects of the present invention may be achieved by providing the trailer with a single fluid actuated piston-cylinder assembly mounted on the lower trailer section and operatively connected to the upper trailer section by means of a plurality of cables which cause the upper trailer section to move twice as far for each increment of movement of the cylinder ram. Guides on the upper trailer section engage slides on the lower trailer section to maintain proper alignment therebetween, and glides attached to the upper and lower hems of the window curtains snap into tracks mounted on the inner wall surface above and below the windows. The upper bunk is pivotally mounted for ready swinging movement out of position where it will not interfere with the lowering of the upper trailer section.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is an isometric view of a telescoping trailer constructed in accordance with this invention, partially broken away to show one of the lift cables for the upper trailer section and guide assembly for maintaining proper alignment of the upper trailer section during movement, such upper trailer section being shown in the raised position;

FIG. 2 is an enlarged fragmentary transverse section taken on the plane of the line 2—2 of FIG. 1 to show the manner of mounting of one of the guide assemblies to the upper trailer section;

FIG. 3 is a fragmentary horizontal section through the wall of the upper trailer section, taken on the plane of the line 3—3 of FIG. 2;

FIG. 4 is an enlarged fragmentary transverse section taken on the plane of the 4—4, FIG. 1, to show the manner of attachment of the cable sheaves to the upper edge of the lower trailer section;

FIG. 5 is a fragmentary horizontal section taken on the plane of the line 5—5 of FIG. 4;

FIG. 6 is an enlarged fragmentary isometric view of a portion of the trailer showing another form of guide assembly for maintaining proper alignment between the upper and lower tariler sections;

FIG. 7 is a schematic diagram showing the fluid actuating and cable mechanism for raising and lowering the upper and lower trailer sections;

FIG. 8 is an isometric view showing the upper trailer section in the lowered position telescoped down over the lower trailer section;

FIG. 9 is a fragmentary side elevation view showing the manner of attachment of the curtains to the inner wall of the upper trailer section;

FIG. 10 is a fragmentary rear elevation of a portion of a curtain with a plurality of curtain guides secured to the upper hems;

FIG. 11 is a fragmentary exploded isometric view showing the curtain glides spaced from the tracks provided therefore;

FIG. 12 is an isometric view of a portion of the trailer interior showing the upper bunk in the down position ready for use;

FIG. 13 is an isometric view similar to FIG. 12 but showing the upper bunk in the up position out of the way where it will not interfere with lowering of the upper trailer section;

FIG. 14 is a fragmentary top plan view of one of the wall hanger mounts for the upper bunk, taken on the plane of the line 14—14, FIG. 12;

FIG. 15 is a fragmentary side elevation view of such wall hanger mount in the up position as seen from the plane of the line 15—15, FIG. 13; and FIG. 16 is a fragmentary top plan view of the side bracket with storage bar engaged therein for releasably retaining the upper bunk in the up position, taken on the plane of the line 16—16 of FIG. 13.

DESCRIPTION OF THE PREFERRED EMBODIMENTS

Referring now in detail to the drawing, wherein like parts are indicated by like reference numerals, there is shown in FIG. 1 a preferred form of telescoping trailer 1 constructed in accordance with this invention comprising a lower trailer section 2 mounted on wheels 4 and an upper trailer section 3 telescoped over the lower trailer section. The lower trailer section 2 may contain the usual kitchen appliances and storage cabinets as well as a table and seats which may readily convert into beds, as well known in the art. Windows 5 may be provided in the upper trailer section 3 and there may also be additional cabinet space therein as long as the cabinets are locating sufficiently close to the roof 6 so as not to interfere with lowering of the upper trailer section 3 in a manner to be subsequently described. A door 7 having an upper portion 8 in the upper trailer section 3 and a lower portion 9 in the lower trailer section 2 in line with each other permits entry and egress into and out of the trailer. A telescoping step 14 may also be provided adjacent the bottom of the door.

The upper trailer section 3 is supported by the lower trailer section 2 for raising and lowering movement by means of a fluid cylinder-assembly 10 which may be rigidly attached to the central portion of the bed frame 11 of the lower trailer section 2 and operatively connected to the upper trailer section 3 by a plurality of cables 12, schematically shown in FIG. 7. Preferably, two cables are provided, each wrapped around sheaves 15 on opposite ends of a yoke 16 attached at its center to the outer end of the cylinder ram 17. One end of each cable 12 is anchored at 18, 18' to the bed frame 11. From each anchor 18, 18' the respective cables extend around sheaves 15 as aforesaid and then around additional sheaves 19 to provide loops 20 in the cables, after which the cables extend toward opposite ends of the trailer where they divide to provide a pair of cable extensions 21 which run to opposite sides of the lower trailer section 2 and up over the top edge of such lower trailer section around additional sheaves 22, 23 and 24 all mounted on the lower trailer section. A bridle 26 interconnects the cable extensions 21 and cables 12. The free ends of the cable extensions 21 are wrapped underneath the lower edge of the upper trailer section 3 where they are tied off by an adjustable bolt connection 25 on the outer surface of the upper trailer section to permit easy access for adjusting the lengths of the cable extensions. The manner of attaching one of the sheaves 24 to the lower trailer section 2 and free ends of the cable extensions 21 to the upper trailer section 3 is shown in FIGS. 1, 4, and 5. A suitable pump 30 may be provided for supplying operating fluid from a reservoir 31 to the piston-cylinder assembly 10 upon actuation of a control valve 32 conveniently mounted for easy reach of the operator. As apparent from FIG. 7, fluid pressure applied to the piston-cylinder assembly 10 will cause outward movement of the ram 17 and yoke 16 carried thereby thus to draw in the cables 12 and raise the upper trailer section 3. Because a single piston-cylinder assembly 10 is provided for actuating both of the cables 12, they will always be pulled to the same extent, thus precluding raising and lowering of opposite ends of the upper trailer section at different rates of speed which could cause the upper trailer section to hang up on the lower trailer section. Moreover, because one end of the cables 12 is anchored to the bed frame 11 and the cables are looped around the sheaves 15 carried by the yoke 16, each increment of movement of the ram 17 causes twice as much movement of the cable extensions 21. Furthermore, since all of the fluid from the pump 30 is supplied to a single piston-cylinder assembly 10, the pump capacity need not be as great than as if it had to supply the requirements of two or more piston-cylinder assemblies, whereby a smaller capacity, less expensive pump may be used to supply fluid at the desired rate. In actual practice, it has been found that such a fluid actuated cable system is capable of raising and lowering the upper trailer section 3 from the fully collapsed condition shown in FIG. 8 to the fully extended position of FIG. 1 and return in less than 30 seconds.

To maintain proper alignment between the upper and lower trailer sections during such raising and lowering movements, T-shaped guides 35 are screw mounted in spaced relation on the outer surface of the lower trailer section 2 for engagement by roller guide assemblies 36 carried by the inner surface of the upper trailer section 3. As clearly shown in FIGS. 1 through 3, each such roller guide assembly 36 may comprise a mounting bracket 37 attached to the wall of the upper trailer section 3 by suitable fasteners 38 for supporting a pair of grooved rollers 39 engageable with opposite edges 40 of the guides 35. Alternatively, a guide block 41 of nylon or other such material may be used in place of the roller guide assembly 36 as shown in FIG. 6 for maintaining proper alignment between the upper and lower trailer sections during such raising and lowering movements. The guide block 41 may be centrally slotted at 42 to span the central portion 43 of the guide 35, with grooves 44 in opposite sides of the slot 42 for receipt of the edges 40 of the guide. Molydisulfide or other lubricant may be one of the materials of the guide block to make it self-lubricating, thus reducing friction.

Lowering of the upper trailer section 3 down over the lower trailer section 2 as shown in FIG. 8 may be accomplished by gravity simply by moving the control valve 32 to the lower position communicating the piston-cylinder assembly 10 with the reservoir 31. However, first of all care must be taken to make sure that there are no obstructions within the trailer which will interfere with or be damaged by such downward movement. Of particular concern have been the curtains 50 for the windows 5 in the upper trailer section 3, since the portion of the upper trailer section 3 containing the windows telescopes over the lower section 2. Thus, if the curtains extend too far out from the inner wall of the upper trailer section or are loose, they may become caught on the upper edge of the lower trailer section and be torn or damaged.

The usual practice has been to remove the curtains completely prior to lowering the upper trailer section, but not without considerable complaint. Accordingly, the curtains in the trailer of the present invention are attached to the walls in such a manner that they may be left in place during raising and lowering of the upper trailer section without fear of damage, since both the upper and lower edges of the curtains are closely held against the inner wall surface of the upper trailer section adjacent the upper and lower edges of the windows.

A plurality of glide members 55 are fastened to the upper and lower hems of the curtains 5 as shown in FIG. 10, each having a beaded rib 56 projecting therefrom which is adapted to be snapped into grooved slide tracks 57 suitably fastened to the inner side wall adjacent the upper and lower edges of the windows with the use of screws, metal clips, or suitable adhesive. Preferably, both the slide tracks 57 and glide members 55 are made of a plastic material, and such glide members 55 are secured to the curtains by a vinyl strip 58 having spaced apart apertures 59 therein for projection of the ribs 56 therethrough. The edges of the vinyl strip 58 may be secured to the hems of the curtains by pinning, sewing, or bonding the same thereto.

Not only does the insertion of the curtain glides into the slide tracks hold the top and bottom edges of the curtains tight against the side of the upper trailer section to enable telescoping of the upper trailer section over the lower trailer section without removing the curtains, but such curtains may be readily opened and closed as desired because of the sliding connection between the glides and slide track, and the curtains may also be removed simply by unsnapping the glides from the slide tracks when it is desired to wash or replace the curtains.

For sleeping accommodations, the table 60 and seats 61 illustrated in FIGS. 12 and 13 may quickly and easily be converted into a double bed, and additional sleeping space may be provided in another area of the trailer. There is also room above the table 60 and seat 61 for a full double bed 62, but storing of the bed has always been a problem when it is desired to use the table 60 and seats 61 or lower the upper trailer section for travelling and the like. To alleviate this storage problem, the bed 62 is hinged to the forward end of the upper trailer section by a pair of swing bars 63 having one end pivoted to one side of the bed and the other end pivoted to a pair of front hangers 64 bolted or otherwise secured to the forward end wall 67 of the trailer. Flanges 65 on the front hangers 64 overlie a ledge 66 on the forward end wall 67 (see FIG. 15) to give further support for one side of the bed 62, and removable legs 70 support the other side of the bed, such legs including a first element 72 pinned to the bed frame 73 by a keeper pin 74 and underlying a portion of such bed frame, and a second element 75 extending perpendicular to the first element 72 and engaging a ledge 76 behind the seat 61.

When not in use, the legs 70 may be removed and the bed swung up out of the way as shown in FIGS. 13, 15 and 16 where it is held in a downwardly inclined position toward the forward end wall 67 by inserting the downturned flange 80 of a pair of storage bars 81 attached to opposite ends of the bed frame 73 into slots 82 in brackets 83 secured to the sides of the upper trailer section. In such inclined position, the weight of the bed will hold it in position forcing the swing bars 63 against the hanger stops 86 out of contact with the forward end wall. A pair of counterbalance cables 85 may interconnect the bed frame with the side brackets 83 for limiting the downward movement of the front side of the bed and supporting the same prior to attaching the removable legs. With the bed 62 in the raised position shown in FIG. 13, there is adequate head room for people to sit and stand near the table 60, and sufficient clearance for telescoping of the upper trailer section down over the lower trailer section.

From the above discussion, it will now be apparent that the telescoping trailer construction of the present invention completely eliminates some of the problems of previous known trailers of this type, such as slow actuation of the upper trailer section, and hanging up of the upper trailer section during such actuation. The curtains may also be left intact during such raising and lowering of the upper trailer section without damage thereto, and an upper bed may be provided which may be readily swung to an out-of-way position where it will not interfere with the telescoping movements of the trailer.

Other modes of applying the principles of the invention may be employed, change being made as regards the details described, provided the features stated in any of the following claims or the equivalent of such be employed.

I therefore, particularly point out and distinctly claim as my invention:

1. A telescoping trailer comprising a lower trailer section, an upper trailer section telescoped over said lower trailer section for raising and lowering movements relative to said lower trailer section, a pair of cables having one end anchored to the bottom of said lower trailer section and the other end secured to opposite sides of said upper trailer section with said cables wrapped over opposite sides of said lower trailer section, sheave means supporting said cables on said lower trailer section, additional sheave means providing loops in said cables adjacent their respective anchored ends, and means supporting said additional sheave means for movement to increase and decrease the size of such loops for raising and lowering said upper trailer section at a faster rate than the movement of said additional sheave means.

2. The trailer of claim 1 wherein said means mounting said additional sheave means for movement comprises a ram, a yoke attached to said ram on which said additional sheave means are mounted, and means for extending and retracting said ram.

3. The trailer of claim 2 wherein said means for extending and retracting said ram comprises a single piston-cylinder assembly, a reservoir, a pump for supplying fluid from said reservoir, and a control valve for selectively connecting said piston-cylinder assembly to said pump and reservoir.

4. The trailer of claim 1 wherein said pair of cables extend in opposite directions toward opposite ends of said lower trailer section, each of said cables having a pair of cable extensions which run to opposite sides of said lower trailer section and up over said lower trailer section sides for attachment to opposite sides of said upper trailer section.

5. The trailer of claim 1 further comprising a plurality of vertically extending T-shaped guides mounted in spaced relation on one of said trailer sections and a corresponding number of roller guide assemblies mounted on said other trailer section, each of said roller guide assemblies including a pair of grooved rollers engaging opposite edges of said vertically extending guides for maintaining proper alignment between said upper and lower trailer sections during raising and lowering movements of said upper trailer section.

6. The trailer of claim 1 further comprising a plurality of vertically extending T-shaped guides mounted in spaced relation on one of said trailer sections and a corresponding number of guide blocks mounted on the other of said trailer sections, said guide blocks having a slot on one edge which spans the central portion of said vertically extending guides, and grooves in opposite sides of said slot which receive opposite edges of said guides for maintaining proper alignment between said upper and lower trailer sections during raising and lowering movements of said upper trailer section.

7. The trailer of claim 6 wherein said guide blocks are made of plastic containing a lubricant so that said guide blocks are self-lubricating.

8. The trailer of claim 1 further comprising windows in said upper trailer section, curtains for said windows, grooved slide tracks fastened to the inner wall of said upper trailer section adjacent the upper and lower edges of said windows, and a plurality of glide members fastened to the upper and lower edges of said curtains, each of said glide members having a beaded rib projecting therefrom adapted to be snapped into said grooved slide tracks for holding said upper and lower edges of said curtains closely against the inner wall surface of said upper trailer section where said curtains will not be damaged during raising and lowering of said upper trailer section.

9. The trailer of claim 8 wherein said glide members are fastened to said curtains by a vinyl strip having spaced apart apertures therein through which said beaded ribs project.

10. The trailer of claim 1 further comprising a bed, and means for mounting said bed in said upper trailer section for swinging movement from a down position whereat said bed may be used for sleeping to an up position whereat said bed will not interfere with raising and lowering of said upper trailer section, said last-mentioned means comprising a pair of hangers mounted on an end wall of said upper trailer section intermediate the height thereof, a pair of swing bars having one end pivoted to one side of said bed and the other end pivoted to said hangers, a pair of legs on the other side of said bed adapted to rest on ledges in said trailer when said bed is in the down position with said bed pivots below said hanger pivots, and means for latching said bed to the sides of said upper trailer section when said bed is in the up position with said bed pivots above said hanger pivots.

11. A telescoping trailer comprising a lower trailer section, an upper trailer section telescoped over said lower trailer section for raising and lowering movement relative to said lower trailer section, means for effecting such raising and lowering movements of said upper trailer section, windows in said upper trailer section, curtains for said windows, grooved slide tracks fastened to the inner wall of said upper trailer section adjacent the upper and lower edges of said windows, and a plurality of glide members fastened to the upper and lower edges of said curtains, each of said glide members having a beaded rib projecting therefrom adapted to be snapped into said grooved slide tracks for holding said upper and lower edges of said curtains closely adjacent the inner wall surface of said upper trailer section where said curtains will not be damaged during raising and lowering of said upper trailer section.

12. The trailer of claim 11 wherein said glide members are fastened to said curtains by a vinyl strip having spaced apart apertures therein through which said beaded ribs project.

13. A telescoping trailer comprising a lower trailer section, an upper trailer section telescoped over said lower trailer section for raising and lowering movements relative to said lower trailer section, means for effecting raising and lowering movements of said upper trailer section, a bed, and means for mounting said bed in said upper trailer section for swinging movement from a down position whereat said bed may be used for sleeping to an up position whereat said bed will not interfere with raising and lowering of said upper trailer section, said last-mentioned means comprising a pair of hangers mounted on an end wall of said upper trailer section intermediate the height thereof, a pair of swing bars having one end pivoted to one side of said bed and the other end pivoted to said hangers, a pair of legs on the other side of said bed adapted to rest on ledges in said trailer when said bed is in the down position with said bed pivots below said hanger pivots, and means for latching said bed to the sides of said upper trailer section when said bed is in the up position with said bed pivots above said hanger pivots.

14. The trailer of claim 13 wherein each of said hangers have a flange which overlie a ledge on said end wall of said upper trailer section to provide further support for said bed.

15. The trailer of claim 13 wherein said legs are pivoted to the frame of said bed to permit removal prior to swinging of said bed to the up position, said legs including a first element pinned to said bed frame as aforesaid and underlying a portion of said bed frame, and a second element extending perpendicular to said first element and engageable with a ledge of said trailer.

16. The trailer of claim 15 further comprising a pair of counterbalance cables having one end attached to opposite sides of said upper trailer section and the other end attached to opposite ends of said bed adjacent the other side thereof for limiting the downward movement of said other side of said bed when said legs have been removed.

17. The trailer of claim 13 wherein said means for latching said bed to the sides of said upper trailer section when said bed is in the up position comprises a pair of brackets mounted on opposite sides of said upper trailer section, and a pair of storage bars attached to opposite ends of said bed, said storage bars having downturned flanges on their outer ends adapted to be received in slots in said brackets.

18. The trailer of claim 17 wherein said hangers have stops for said swing bars, and the other side of said bed is held higher by said brackets than said bed pivots when said bed is in the up position, whereby the weight of the bed presses said swing bars against said stops.

References Cited

UNITED STATES PATENTS 3,323,778    4/1966    Baker _____ 296—23 X
3,339,321    9/1967    Schmidt _____ 52—66

PHILIP GOODMAN, Primary Examiner

U.S. Cl. X.R.

52—67; 296—27